Figure 1:
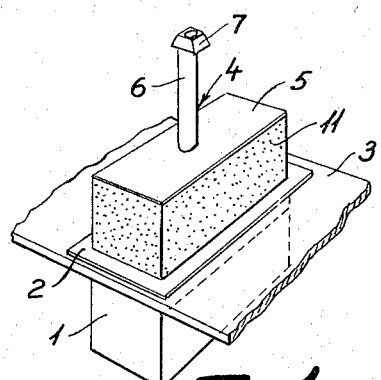

April 4, 1967   H. GRAM   3,312,082
APPARATUS FOR PICKING UP FROZEN BODIES FROM A FREEZING MOLD
Filed Dec. 17, 1964

INVENTOR.
Hans Gram
BY
Watson, Cole, Grindle & Watson
ATTORNEYS

United States Patent Office 3,312,082
Patented Apr. 4, 1967

3,312,082
APPARATUS FOR PICKING UP FROZEN BODIES FROM A FREEZING MOLD
Hans Gram, Vojens, Denmark, assignor to Brodrene Gram A/S, Vojens, Denmark
Filed Dec. 17, 1964, Ser. No. 419,053
Claims priority, application Denmark, Dec. 20, 1963, 5,989
2 Claims. (Cl. 62—353)

This invention relates to a method of picking up frozen bodies from a freezing mold, in which a pick-up member protruding from the frozen body is attached thereto by freezing.

As a pick-up member, it is known to use two steel pins which are pricked into the material to be frozen and, upon completion of freezing and release of the frozen body from the mold by thawing, are gripped to extract or pick up the frozen body, whereafter the latter is stripped off the pins. As a consequence of this procedure, holes are formed in the finished frozen body.

It is the object of the invention to provide a method of the type referred to which may be carried out in such a manner that the frozen body will have a continuous surface upon extraction. With this object in view, according to the invention, a pick-up member is used which has a flat side devoid of projections, said flat side being attached by freezing to a surface area of the frozen body. By using such a pick-up member, the advantage is obtained that upon removal of the pick-up member the frozen body will be devoid of holes. The pick-up member may be removed from the frozen body in various ways e.g. by thawing or by introducing a thin tool between the side of attachment of the pick-up member and the frozen body. By experiments carried out in connection with the invention, it has been found that such attachment-by-freezing of a flat side of a pick-up member to a surface area of a frozen body is sufficient to transfer the forces necessary for picking up the frozen body.

With particular advantage, according to the invention, the flat side of the pick-up member is released from the frozen body by elastic deformation of said flat side away from its original state. It has been found that such elastic deformation suffices to release the pick-up member from the frozen body. Such release may however also be obtained by administering shocks or blows to the frozen body or the pick-up member.

During freezing of the body, solidification or congealing of the material will substantially take place from the outer face of the body and progressively inwards. At the same time, the material being frozen expands, and owing to this expansion the pick-up member may be pressed upwards, whereby it edges will move away from the already frozen lateral portions of the body. While a body frozen in this manner will still have a nice appearance, the appearance may be additionally improved, according to the invention, by using a pick-up member having a hole connecting the flat side of the pick-up member with its opposite side. Thereby, the advantage is obtained that some of the material has the opportunity of escaping so that the pick-up member may remain in its original position relative to the mold. If, however, a relatively viscous material is used, the flow of this through the said hole may give rise to so great forces that the pick-up member will be moved upwards. According to the invention, this may be counter-acted by removing material from the freezing mold during freezing through the hole corresponding to the increase of volume of the material confined in the mold occurring during freezing thereof. An alternative procedure is, however, to hold the pick-up member firmly in position relative to the mold and leave it to the material to press itself out through the hole.

The invention also relates to an apparatus for carrying out the method, said apparatus comprising at least one upwardly open freezing mold and a pick-up member adapted to be attached to the material in the mold by freezing, the particular feature of such an apparatus characteristic of the invention being that the pick-up member has a flat side devoid of projections, said flat side being substantially parallel to the opening of the freezing mold when in its position of attachment-by-freezing.

According to the invention, the flat side of the pick-up member may be constituted by one side of a flexible plate, which is constructed with two wings on the side thereof remote from the freezing mold in the position of attachment-by-freezing of said flexible plate. In this manner, a simple release of the frozen body from the pick-up member is obtained, viz. by moving the wings relative to one another, whereby the plate is deformed to release the frozen body.

The pick-up member may, in a manner known per se, have a hole connecting the face of attachment-by-freezing of the pick-up member with the opposite side thereof, so as to permit material to escape through said hole during freezing, and in that case, according to the invention, in order to avoid soiling of the apparatus, means may be provided for removing material from the freezing mold through the hole corresponding to the increase of volume of the material confined in the mold occurring during freezing thereof.

While reference has been made in the beforegoing to a method and an apparatus with one freezing mold, it will be understood that the method and the apparatus may just as well be used in connection with a plurality of molds.

Figure 2:
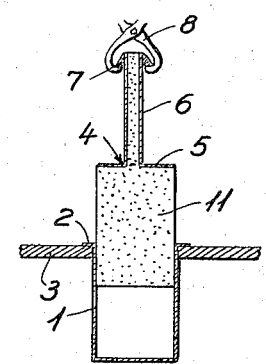
Figure 3:
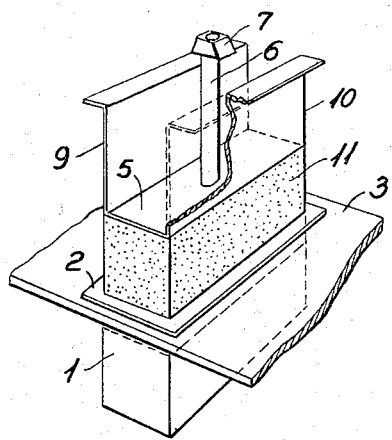
Figure 4:
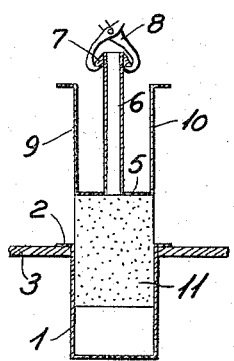

The invention will now be explained in further detail with reference to the accompanying drawings, in which FIG. 1 shows the essential parts of one form of an apparatus according to the invention in perspective view, FIG. 2 is a cross section through same, FIG. 3 is an illustration corresponding to FIG. 1 of a modified embodiment, and FIG. 4 is a cross section of the parts illustrated in FIG. 3.

In the drawing, 1 is a freezing mold, which is open at its top and constructed along the edge of its mouth with a flange 2 supported on the upper side of a table 3 through which the mold extends.

4 is a pick-up member consisting of a plate 5 and a tube 6 opening at the underside of the plate 5 and constructed at its upper end with a head 7. In the embodiments shown, the apparatus further comprises a gripping claw 8, FIGS. 2 and 4, adapted to grip the head 7.

In the embodiment illustrated in FIGS. 3 and 4, the plate 5 is constructed with upstanding wings 9 and 10 along the edges thereof.

When using the apparatus, the mold 1 is partly filled with material to be frozen to form a body 11, and the underside of the plate 5 is then placed on top of the material so that upon freezing of the material, the plate will be attached by freezing to the frozen body 11. When the frozen body has been congealed, a brief thawing is effected to release the frozen body 11 from the mold, whereupon the pick-up member 4 with the body 11 attached by freezing thereto can be lifted by means of the claw 8.

In the embodiment illustrated in FIG. 1, the frozen body 11 may be removed from the plate 5 by introducing a knife between the plate and the frozen body, or alternatively the plate 5 may be heated for a short period of time, or the frozen body 11 may simply be struck off the plate.

In the embodiment illustrated in FIGS. 3 and 4, the plate 5 may be very easily released from the frozen body by pressing the two wings 9 and 10 towards one another whereby the plate 5 is deformed so as to be released from the frozen body 11.

In the embodiments illustrated in the drawing, the material in the mold 5 is permitted to expand during congealing seeing that an amount of material corresponding to the increase of volume of the material confined in the mold may escape through the tube 6. In order to avoid soiling, the apparatus may be constructed with means connectable to the upper end of the tube 6 for the purpose of withdrawing excess material, or alternatively a probing needle may be introduced into the tube 6 to suck this tube empty before separation of the frozen body from the pick-up member.

During congealing of the material in the mold, this will predominantly take place from the outer face inwards, and if the material is left to itself, congealing will therefore first take place in the form of a shell along the inner face of the mold 1. The upper surface of the material, which is congealed only later, will therefore arch upwards so that no full-edged block is formed. This may be entirely avoided by the apparatuses illustrated in the drawing where the plate 5 fills out the cross section of the mold practically completely, and where escape of material is permitted during congealing. In conjunction with the formation of a full-edged block, a simple extraction is obtained owing to the attachment-by-freezing of the plate 5 and the frozen body 11. However, a simple extraction of the frozen body is also obtained even if the pick-up member 4 just has a side face adapted to be attached by freezing to a surface area of the frozen body 11 provided only the area is great enough to ensure sufficient adhering forces to lift the frozen body. A further possibility is to use a pick-up member having a side face approximately corresponding to the top surface of the frozen body and to permit this pick-up member to move during freezing. In this case, where no tube 6 is provided, the pick-up member will be constructed with any suitable form of projections by means of which the lifting force may be transmitted to the pick-up member.

I claim:

1. Means for picking up frozen bodies from a freezing mold, said mold having inner sides and being open at the top end thereof and filled with a frozen substance, comprising a pick-up member having a flat side devoid of projections into said mold and frozen to the surface of the substance in the mold, the transverse dimensions of said flat side being smaller than the transverse dimensions of said open top end of said mold, said pick-up member further having engaging means secured thereto at a position opposite to said flat side adapted for lifting and lowering said pickup member in relation to said mold, wherein the pick-up member is in the form of a flexible plate of U-form, the lower surface of the bottom of said U-formed plate being said flat side devoid of projections, and wherein said engaging means are secured to the upper surface of the flat side at the bottom of said U-formed plate.

2. Means for picking up frozen bodies from a freezing mold, said mold having inner sides and being open at the top end thereof and filled with a frozen substance, comprising a pick-up member having a flat side devoid of projections into said mold and frozen to the surface of the substance in the mold, the transverse dimensions of said flat side being smaller than the transverse dimensions of said open top end of said mold, said pick-up member further having engaging means secured thereto at a position opposite to said flat side adapted for lifting and lowering said pick-up member in relation to said mold, and said pick-up member having a tube extending from said flat side and out of the opposite side of said pick-up member to form an ascending member into which overflow substance may enter as freezing takes place to produce continuous surface contact between said substance and said flat side.

References Cited by the Examiner

UNITED STATES PATENTS

| 2,495,421 | 1/1950 | Pownall | 62—356 |
| 2,741,104 | 4/1956 | Sasnett et al. | 62—135 |
| 2,775,099 | 12/1956 | Brown. | |
| 3,142,106 | 7/1964 | Wise et al. | 18—2 |

FOREIGN PATENTS

| 576,972 | 5/1933 | Germany. |
| 738,660 | 7/1943 | Germany. |

ROBERT A. O'LEARY, *Primary Examiner.*

W. E. WAYNER, *Assistant Examiner.*